(12) United States Patent
Ali et al.

(10) Patent No.: US 9,819,683 B2
(45) Date of Patent: Nov. 14, 2017

(54) AUTOMATED CONTROL OF TECHNOLOGY RESOURCES

(71) Applicant: BANK OF AMERICA CORPORATION, Charlotte, NC (US)

(72) Inventors: Amer Ali, Jersey City, NJ (US); John Curcio, West Caldwell, NJ (US); Jyothiswar Reddy Sama, Edison, NJ (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 144 days.

(21) Appl. No.: 15/070,932

(22) Filed: Mar. 15, 2016

(65) Prior Publication Data
US 2017/0272436 A1    Sep. 21, 2017

(51) Int. Cl.
*G06F 21/62* (2013.01)
*H04L 29/06* (2006.01)

(52) U.S. Cl.
CPC .................. *H04L 63/10* (2013.01)

(58) Field of Classification Search
CPC .................. G06F 21/62; G06F 21/31
See application file for complete search history.

(56) References Cited

U.S. PATENT DOCUMENTS

2013/0086696 A1* 4/2013 Austin .................. G06F 21/335
726/28

* cited by examiner

Primary Examiner — Izunna Okeke
(74) Attorney, Agent, or Firm — Michael A. Springs; Moore & Van Allen PLLC; James C. Edwards

(57) ABSTRACT

The present invention provides for a fully automated process for controlling technology resources. Specifically, embodiments of the invention streamline the process for initiating a request by employing an Application Programming Interface (API) to make calls to other applications/tools (e.g., project tools and the like) and automatically imports data from the other applications/tools to the technology resource module/tool. Moreover, embodiments of the invention provide for automated validation of data entries by employing the API to make calls to systems of record and the like to compare data entries to data in the systems of record. Embodiments of the invention are configured such that the technology resource process will not proceed to the review/approval stage until successful validation of all requisite data entries has been completed.

17 Claims, 10 Drawing Sheets

AUTOMATED CONTROL OF TECHNOLOGY RESOURCES

FIELD

In general, embodiments of the invention relate to managing control and governance of technology resources and, more specifically, an automated method for comprehensive control of the technology resources.

BACKGROUND

A need exists to develop a fully automated process for control and/or governance of technology resources. The desired automated process should add formality and consistency to the overall process, such that each technology request, regardless of the entity within an enterprise associated with the request, the type of technology sought and the like, occurs in a uniform manner. In addition, the desired automated process should be less time consuming and, thus, more cost efficient (i.e., reduce unnecessary overhead). In this regard, the desired process should include requisite timelines for completing tasks and eliminate redundancy.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for a fully automated process for control and/or governance of technology resources. The automated process provides requisite formality and consistency to the overall process. The automated process of the present invention is a more streamlined and time efficient process which results in a more cost efficient (i.e., lower overhead) process.

Specifically the present invention, streamlines the data entry process for initiating a request by employing an Application Programming Interface (API) to make calls to other applications/tools (e.g., project tools and the like) and automatically imports data from the other applications/tools to the technology resource module/tool. Moreover, the present invention provides for automated validation of data entries by employing the API to make calls to systems of record and the like to compare data entries to data in the systems of record. The invention is configured such that technology resource process will not proceed to the review/approval stage until successful validation of all requisite data entries has been completed.

Further, the present invention automatically generate and communicate approval messages to each stakeholder/approval entity within each approval group. The messages are configured for offline review and approval, whereby the approval entity can access a link to approve the technology resource request, absent having to access the technology resource module/tool. In addition, the approval entity can access a link to ask the technology resource requester questions associated with the request, absent having to access the technology resource module/tool or sending an email.

Moreover, the present invention provides for logging each and every action taken by the technology resource module/tool, including actions taken by the requestor and the approval entities; including, but not limited to, who approved, when an approval entity received a request, when an approval entity approved/denied a request and the like. In this regard, the present invention, through use of a robust analytics engine, is able to provide and present detailed analytically data, as well as extensive metrics.

In addition, the present invention provides a unique user experience, in which the user is presented multiple user interfaces. Specifically, a user is presented their user queue, which allows the user visibility into technology resource requests initiated by the user and the approval status, as well as, technology resource requests requiring the user's approval (in the event the user is a designated approval entity). In addition, the user interfaces are configured with an overflow technology resource workflow, which visually indicated the stage/queue at which a technology resource request process currently resides. Moreover, the user interfaces present a series of user activatable data type-specific tabs, which provide a user access to data entry fields. The data entry fields are configured such that only relevant data entry fields are shown or require inputs based on the type of technology resource request initiated (i.e., software, servers, networks, storage or the like).

In this regard, the desired process should include requisite timelines for completing tasks and eliminate redundancy. Moreover, the desired automated process should provide for analytical data and metrics that provide an overall picture of the process and allow the enterprise to gauge the performance of the process.

An apparatus for automated control and governance of technology resource defines first embodiments of the invention. The apparatus includes a computing platform having a memory and at least one processor in communication with the memory. The apparatus further includes an application programming interface stored in the memory and executable by the processor. In addition, the apparatus includes a technology resource module that is stored in the memory and executable by the processor. The module includes a user interface application that is configured to present a plurality of user interfaces for managing a technology resource process. Additionally, the module includes a technology resource request and data entry engine configured to provide one or more of the user interfaces for initiating a technology resource request for procuring at least one of computing software or computing hardware. The request includes user input of at least one project identifier associated with auxiliary applications. The request and data entry engine is further configured to automatically, in response to initiating the technology resource request, implement the application programming interface to access, using the project identifiers, one or more of the auxiliary applications to retrieve data and provide entry of the retrieved data in requisite data entry fields. In addition, the request and data entry engine is further configured to receive user inputs to one or more of the requisite data entry fields. In specific embodiments the data entry fields are configured to allow for uploading one or more documents to fulfill a data entry request.

In addition, the module includes an integration and validation engine configured to automatically validate data entries provided in the requisite data fields, by implementing the application programming interface to access one or more systems of record and compare the data entries to data in the systems of record. Successful validation of requisite data entries is required prior to proceeding to a successive stage of the technology resource control process.

In specific embodiments of the apparatus the technology resource module further includes a messaging engine configured to, in automatic response to validating data entries provided in the requisite data fields, generate a plurality of approval messages and initiate communication of the approval messages to predetermined technology resource approval entities. The approval messages are configured to allow the entities to access a link that approves the technology resource control request absent the entities accessing the technology resource module. In further related embodiments of the apparatus, the approval messages are configured to provide the technology resource approval entities an ability to communicate queries to a technology resource requestor, via the technology resource module, absent the entities accessing the technology resource module.

In additional specific embodiments of the apparatus, the technology resource module further includes a logging engine configured to track, log and store details of each action taken by the technology resource module; including storage locations, the duration of events, such as an approval/review, entity who approved and the like. In related embodiments of the apparatus, the technology resource module further includes an analytics engine configured to access the logged data to determine analytical data associated the technology resource control processes. In further specific embodiments of the apparatus, the user interface application is further configured to present the plurality of user interfaces, which include an analytics dashboard that presents a visual display of the analytical data.

In still further specific embodiments of the apparatus, the user interface application is further configured to present the plurality of user interfaces, including a user queue that includes technology resource request initiated by the user and approval requests requiring approval by the user.

Moreover, in further specific embodiments of the apparatus, the user interface application is further configured to present the plurality of user interfaces, in which one or more of the user interfaces include an overall technology resource control process workflow that visually displays the current status of a current technology resource control process. Further, in other embodiments of the apparatus, one or more of the user interfaces include data tabs that indicate different data types. In such embodiments of the apparatus, user selection of a data tab provides display of one or more user interfaces that provide the requisite data entry fields for a data type associated with the selected data tab.

In other specific embodiments of the apparatus, the user interface application is further configured to present the plurality of user interfaces, in which one or more of the user interfaces include current technology resource request approval status, for each of the technology resource approval entities, for a technology resource request. The current approval status provides access to details related an approval, a non-approval or a pending approval request. In other related embodiments, the user interface application is further configured to present the plurality of user interfaces, in which one or more of the user interfaces include a listing of technology resource request events associated, wherein the listing including event start times, length of time for an event, and user comments associated with an event. In further embodiments of the apparatus, the user interface application is further configured to present the plurality of user interfaces, in which one or more of the user interfaces provide a searchable listing of current in-progress technology resource control processes.

In yet further specific embodiments of the apparatus, the technology resource governance module is further configured to automatically provide data resulting from a completed technology resource control processes to a provisioning module.

A system for automated control and governance of technology resource defines second embodiments of the invention. The system includes one or more auxiliary applications which are configured to receive and store first data associated with technology projects and one or more systems of records which are configured to store second data used to validate data entries in a technology resource module. Additionally, the system includes a computing platform having a memory and at least one processor in communication with the memory. The system also includes an application programming interface that is stored in the computing memory and executable by a computing processor. Further, the system includes a technology resource module that is stored in the memory and executable by the processor. The module includes a user interface application that is configured to present a plurality of user interfaces for managing a technology resource process. Additionally, the module includes a technology resource request and data entry engine configured to provide one or more of the user interfaces for initiating a technology resource request for procuring at least one of computing software or computing hardware. The request includes user input of at least one project identifier associated with auxiliary applications. The request and data entry engine is further configured to automatically, in response to initiating the technology resource request, implement the application programming interface to access, using the project identifiers, one or more of the auxiliary applications to retrieve data and provide entry of the retrieved data in requisite data entry fields. In addition, the request and data entry engine is further configured to receive user inputs to one or more of the requisite data entry fields. In specific embodiments the data entry fields are configured to allow for uploading one or more documents to fulfill a data entry request.

In addition, the module includes an integration and validation engine configured to automatically validate data entries provided in the requisite data fields, by implementing the application programming interface to access one or more systems of record and compare the data entries to data in the systems of record. Successful validation of requisite data entries is required prior to proceeding to a successive stage of the technology resource control process.

A computer program product including a non-transitory computer-readable medium defines third embodiments of the invention. The computer-readable medium includes a first set of codes for causing a computer to present display of a plurality of user interfaces for managing a technology resource process. One or more of the user interfaces provide for initiating a technology resource request for procuring at least one of computing software or computing hardware. The computer-readable medium additionally includes a second set of codes for causing a computer to (i) receive a user input that initiates the technology resource request, wherein the input includes at least one project identifier associated with auxiliary applications, (ii) automatically, in response to initiating the technology resource request, implement an application programming interface to access, using the project identifiers, one or more of the auxiliary applications to retrieve data and provide entry of the retrieved data in requisite data entry fields, and (iii) receive user inputs to the requisite data entry fields. Additionally, the computer-readable medium includes a third set of codes for causing a computer to automatically validate data entries provided in the requisite data fields, by implementing the application programming interface to access one or more systems of record and compare the data entries to data in one or more systems of record. Successful validation of data entries is required prior to proceeding to a successive stage of the technology resource control process.

Thus, systems, apparatus, methods, and computer program products herein described in detail below provide for a fully automated process for control and/or governance of technology resource. Specifically the present invention, streamlines the data entry process for initiating a requisite by employing an Application Programming Interface (API) to make calls to other applications/tools (e.g., project tools and the like) and automatically imports data from the other applications/tools to the technology resource module/tool. Moreover, the present invention provides for automated validation of data entries by employing the API to make calls to systems of record and the like to compare data entries to data in the systems of record. The invention is configured such that technology resource process will not proceed to the review/approval stage until successful validation of all requisite data entries has been completed.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
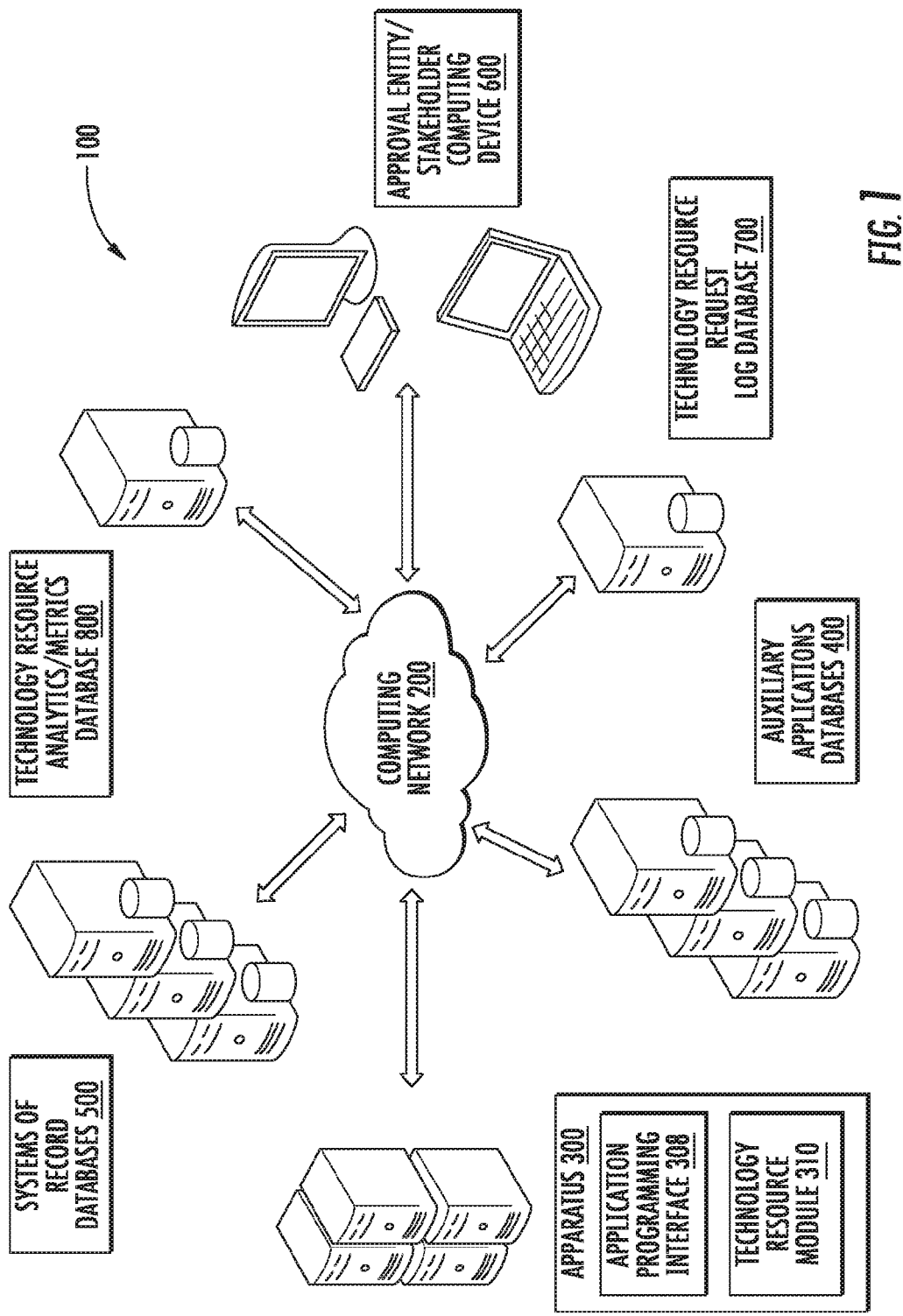
Figure 2:
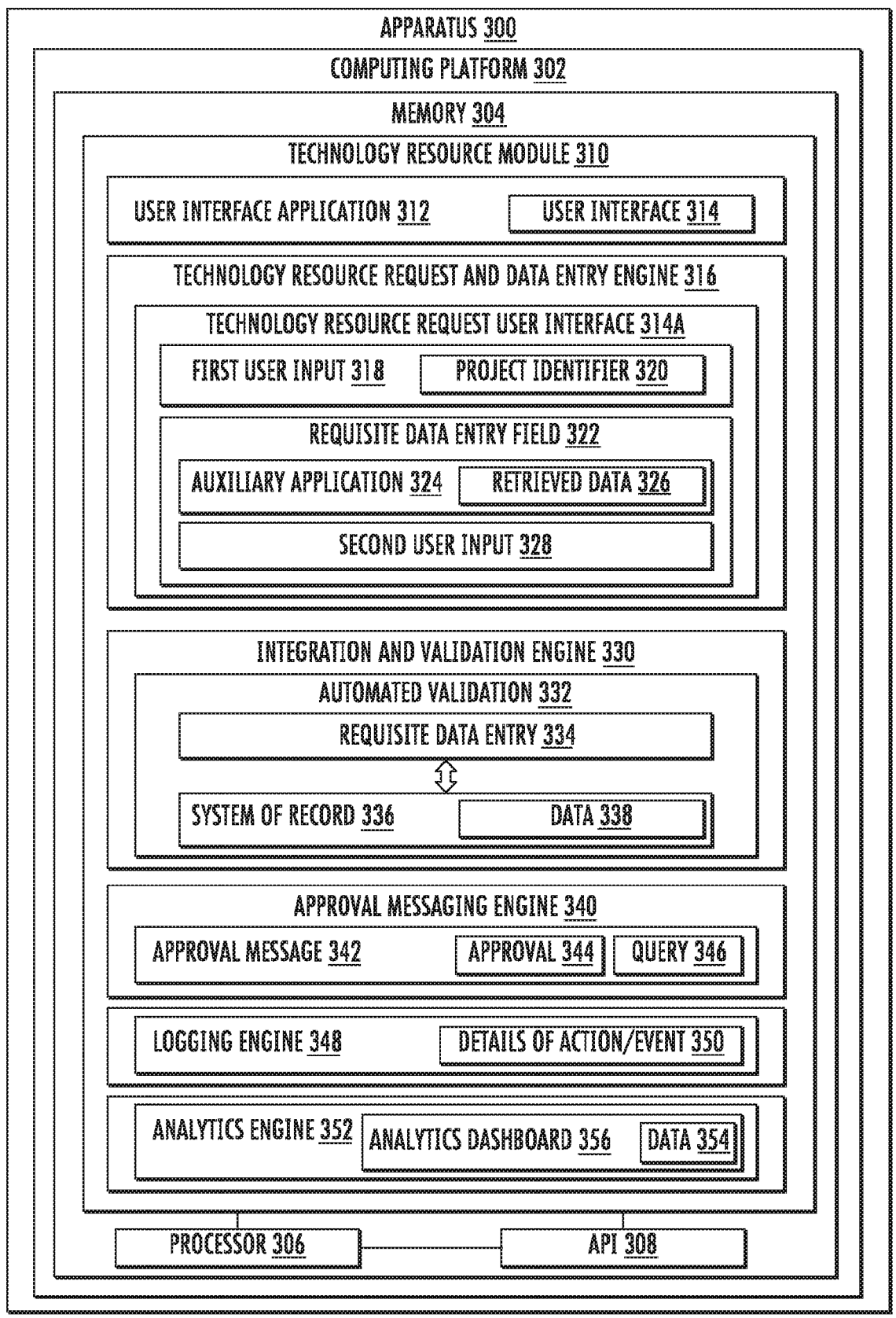

Having thus described embodiments of the invention in general terms, reference will now be made to the accompanying drawings, which are not necessarily drawn to scale, and wherein:

FIG. 1 provides a schematic diagram of an exemplary system for automated control and governance of technology resource, in accordance with embodiments of the present invention;

FIG. 2 provides a block diagram of an apparatus for automated control of technology resources, in accordance with embodiments of the present invention; and FIGS. 3-10 provide various exemplary user interfaces presented in control technology resource module/tool, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

In large enterprise technology is constantly evolving and changing. In this regard, large enterprises are always acquiring and/or updating technology; including both software and hardware. However, before an enterprise decides to acquire or update technology, initial decisions have to be made concerning the necessity of such acquisitions/updates. For example, the enterprise must assess whether they already possess such functionality and, if so, whether the current capacity for such functionality is sufficient to support the additional requirements. Moreover, the enterprise must assess the cost implications of such acquisitions/updates. For example, is the proposed technology acquisition the most cost effective solution for addressing the technology requirement.

In many, if not most, enterprises the procurement process is an informal, ad-hoc process. In large enterprises, various factions within the enterprise, such as lines-of-business, divisions and the like, each may employ separate formal and informal procedures for the technology resource acquisition process. Further exasperating the inconsistency problems, various different types of technology, e.g., servers, network, storage or the like, may each have separate governance procedures for their particular technology. Moreover, the informal nature of the process means that changes in the process flow can occur within a given technology resource request with no ramifications. The lack of uniformity of the process results in inconsistent results.

In addition, the informal nature of most technology resource acquisition procedures typically involves multiple reviews, follow-ups and approval chains for the same area of the technology resource acquisition process. As a result, unnecessary redundancy occurs within many processes. Moreover, such informal reviews typically do not have defined time requirements for completing stages of the technology resource acquisition process and, therefore, the process often is time consuming. In this regard it is not uncommon for the process to incur a 30-90 day cycle from when the technology resource acquisition process is initiated until when the purchase order is generated.

A further problem with most technology resource processes is that no controls exist to insure timeliness, consistency and the like. In this regard, most processes do not provide for service level agreements (SLAs), since the process is incapable of capturing analytics and/or measure metrics related to the process According to embodiments of the invention described herein, various systems, apparatus, methods, and computer program products are herein described for automated control of technology resources. Technology resource acquisition/procurement is a decisioning process to determine a need to acquire/update software or hardware. The decisioning process takes into account current capacity/functionality, including competing priorities within an enterprise, cost of acquisition/update and the like. The automated process of the present invention provides requisite formality and consistency to the overall process. Additionally, by automating the process the present invention provides a more streamlined and time efficient process which results in a more cost efficient process.

Specifically the present invention, streamlines the process for initiating a request by employing an Application Programming Interface (API) to make calls to other applications/tools (e.g., project tools and the like) and automatically imports data from the other applications/tools to the technology resource module/tool. Such automatic import of data is less time consuming and provides for more accurate data; leading to less issues at the validation stage.

Moreover, the present invention provides for automated validation of data entries by employing the API to make calls to systems of record and the like to compare data entries to data in the systems of record. Once again, such automated validation results in time efficiency and more consistent validation. Further, the invention is configured such that each stage of the process must be completed before a subsequent stage is allowed to proceed. For example, the review/approval stage will not proceed until successful validation of all requisite data entries has been completed. Such stop-gate processing insures overall consistency in the control of technology resources.

In addition, the present invention is configured to automatically generate, communicate and track approval messages, which are communicated to each stakeholder/approval entity within each approval group. The messages are uniquely configured for offline review and approval, whereby the approval entity can access a link to approve the technology resource request, absent having to access the technology resource module/tool. In addition, the approval entity can access a link to query the technology resource requester associated with the request, absent having to access the technology resource module/tool or sending an email. Moreover, the present invention provides for logging each and every action taken by the technology resource module/tool, including actions taken by the requestor and the approval entities. In this regard, the present invention, through use of a robust analytics engine, is able to provide and present detailed analytically data, as well as metrics.

Referring to FIG. 1, a schematic diagram is provided of a system 100 for control technology resources, in accordance with embodiments of the present invention. The system 100 is implemented via a distributed computing network 200, which may include the Internet, as well as, one or more intranets or the like. It should be noted that while FIG. 1 depicts various separate databases and the like, it is conceivable and within the inventive concepts herein disclosed, for databases to be combined, such that, information from one database is included within another database, obviating the need for a separate database(s) in those instances in which databases are combined. The system 100 includes apparatus 300, which may comprise one or more computing devices, such as one or more, personal computers, servers or the like. Apparatus 300 stored technology resource module 310, which is configured to automate management of the control of a technology resource acquisition process. In specific embodiments of the system, technology resource module 310 is configured to implement applications programming interface 308 to access, based on a project identifier or the like, one or more auxiliary application databases 400 associated with one or more auxiliary applications and retrieve data relevant to the technology resources. The auxiliary applications may be upstream applications associated with the technology resource acquisitions, such as project applications/tools or the like. Since such auxiliary applications are typically executed, for a given project or the like, prior to executing the technology resource module 310 they will include data entries for information that is relevant to the technology procurement. The retrieved data is used to pre-populate relevant data entry fields at the data entry stage of the technology resource process. Such importing of data eliminates the need for manual data entry of requisite data, thus, not only providing for a time savings but, also, assuring the accuracy of inputted data.

In other specific embodiments of the system 100, technology resource module 310 is configured to automatically validate data entries, both pre-populated and manual, through execution of the implement applications programming interface 308, which accesses one or more systems of record databases 500. The system of record 500 store verified data, which is compared to the data entries as a means of validating the data entries. Such automated validation eliminates the need for manually validating the data entries and assures the accuracy of the validation. Additionally, the technology resource module 310 is configured, such that successful completion of the validation process is required prior to proceeding to the subsequent stage of review/approval by designated entities. In the event, that one or more data entries are determined to be invalid, the technology resource requester is required to correct the invalid data entries and revalidate the entries before the module moves to the review/approval stage. Once all the data entries have been successfully validated, the module 310 is configured to generate and initiate communication of approval messages to designated approval entities (i.e., approval entity/stakeholder computing devices 600). By insuring that validation of all data entries has occurred prior to generating and communicating the approval messages, the present invention, eliminates the possibility of reviews occurring prior to the requester providing all required data and/or validating all required data and insures that reviews and approval are based on valid data.

Further, the technology resource module 310 is configured to generate and communicate messages to designated approval entities (i.e., approval entity/stakeholder computing devices 600), which are configured to allow the approval entity to approve the technology resource request, absent the approval entity having to execute the technology resource module 310. In this regard, the message may be configured to include an activatable link that allows the approval entity, upon activation, to approve the technology resource request. In similar fashion, the messages may be configured to allow the approval entity to query the requester with any question regarding the request, absent the approval entity having to execute the technology resource module 310.

In addition, the technology resource module 310 is configured to log, each and every action associated with the module; including actions taken by the requester, as well as, the approval entities, and store the logged actions in technology resource request log database 700. In addition, user interfaces within the module provide user access to the logged data, so that a user (i.e., requester and/or approval entity) can see a chronological listing of actions associated with a request. Moreover, the technology resource module 310 is configured to access technology resource request log database 700 to generate analytical data and/or metrics associated with ongoing and/or historical technology resource requests, which are stored in technology resource analytics/metrics database 800.

Referring to FIG. 2 a block diagram is presented of the apparatus 300, which is configured for automated control and governance of technology procurement, in accordance with embodiments of the present invention. In addition to providing greater detail, FIG. 2 highlights various alternate embodiments of the invention. The apparatus 300 may include one or more of any type of computing device, such as a personal computer, a server or the like. The present apparatus and methods can accordingly be performed on any form of one or more computing devices.

The apparatus 300 includes a computing platform 302 that can receive and execute algorithms, such as routines, and applications. Computing platform 302 includes memory 304, which may comprise volatile and non-volatile memory, such as read-only and/or random-access memory (RAM and ROM), EPROM, EEPROM, flash cards, or any memory common to computer platforms. Further, memory 304 may include one or more flash memory cells, or may be any secondary or tertiary storage device, such as magnetic media, optical media, tape, or soft or hard disk. Moreover, memory 304 may comprise cloud storage, such as provided by a cloud storage service and/or a cloud connection service.

Further, computing platform 302 also includes processor 306, which may be an application-specific integrated circuit ("ASIC"), or other chipset, processor, logic circuit, or other data processing device. Processor 306 or other processor such as ASIC may execute an application programming interface ("API") 308 that interfaces with any resident programs, such as technology resource module 310 and routines, engines, sub-modules associated therewith or the like stored in the memory 304 of the apparatus 300.

Processor 306 includes various processing subsystems (not shown in FIG. 2) embodied in hardware, firmware, software, and combinations thereof, that enable the functionality of apparatus 300 and the operability of the apparatus on a network. For example, processing subsystems allow for initiating and maintaining communications and exchanging data with other networked devices, such as those apparatus, databases and repositories shown in FIG. 1. For the disclosed aspects, processing subsystems of processor 306 may include any subsystem used in conjunction with technology resource module 310 and related algorithms, sub-algorithms, modules, sub-modules thereof.

Computer platform 302 may additionally include communications module (not shown in FIG. 2) embodied in hardware, firmware, software, and combinations thereof, that enables communications among the various components of the apparatus 300, as well as between the other networked devices. Thus, communication module may include the requisite hardware, firmware, software and/or combinations thereof for establishing and maintaining a network communication connection.

The memory 304 of apparatus 300 stores technology resource module 310, which is configured to automatically manage the control of technology resource acquisition, in accordance with embodiments of the invention. The module includes user interface application 312 that is configured to present a plurality of user interfaces 314 for managing the control of technology resource acquisition. Exemplary user interfaces 314 are shown and described in FIGS. 3-10, infra. User interfaces 314 provide for a user to initiate a technology resource request and provide input of requisite data, such as, but not limited to, strategy data, financial data, project data, quotes, control data, shipping data, network data, storage data and/or the like. Further, user interfaces 314 allow for a user to manage their specific technology resource queue, including technology resource requests initiated by the user, and, where applicable, technology resource requests in which the user is a designated approval entity. Moreover, user interfaces 314 provide for a searchable database of details of technology resource requests, including currently outstanding requests, as well as, historical requests.

Technology resource module 310 includes technology resource request data entry engine 316 that is configured to provide one or more of the user interfaces 314A for initiating a technology resource request for procuring software and/or hardware. The request includes a first user input 318 of at least one identifier, such as project identifier 320 or some other upstream identifier associated with the software and/or hardware being procured. The technology resource request data entry engine 316 is further configured to, in response to initiating the request and receiving the first user input 318, implement the API 318 to automatically access one or more auxiliary applications 324 to retrieve data 326 and provide entry (i.e., pre-populate) of the retrieved data 326 in requisite data entry fields 322 in the one or more user interfaces 314A. In this regard, the technology resource request data entry engine 316 uses the project identifier(s) 320 to access the auxiliary applications/tools 324, which may be any upstream application/tool that is associated with the software and/or hardware being procured. For example, the auxiliary applications may be associated with the project or the like. Such automated entry of retrieved data 326 in the requisite data entry fields 322 insures that the data is accurate and eliminates the need for the user/requester to input the data. Moreover, technology resource request data entry engine 316 is configured to receive second user inputs 328 to one or more of the requisite entry fields 322, for example, the second user inputs 328 may provide input to those requisite data entry fields 322 that were not pre-populated with retrieved data 322 or may serve to override the retrieved data 326.

Technology resource module 310 additionally includes integration and validation engine 330 which is configured, in response to the completion of the data entry process, to automatically validate 332 the requisite data entries 334 by implementing the API 308 to access one or more systems of record 336 and compare the data 338 stored in the systems of record 336 to the requisite data entries 334. In the event that the integration and validation engine 330 determines that one or more of the requisite data entries are invalid, the user/requester is notified of such, via a pop-up user interface, and requested to provide a new data entry and re-validate the new data entry. The integration and validation engine 330 is configured such that successful completion of the validation of the data entries 334 is required before the module 310 proceeds to the stage of the technology resource control process, e.g., the review/approval stage. In this regard, the technology resource module 310 is configured such no technology resource request will be released for review/approval by the designated approval entities until all data entries have been invalidated; eliminating the possibility of having the reviewers/approval entities receiving approval requests with partial data entries and/or incorrect data entries.

Technology resource module 310 additionally includes approval messaging engine 340 which is configured to automatically generate and initiate communication of approval messages 342 to one or more approval entities. In addition, the approval messaging engine 340 is configured to track approval to insure that the approval stage of the technology resource process occurs within a designated timeframe. The approval messages 342 are, according to some embodiments of the invention, configured to include an activatable link which allows the approval entity to provide their approval 344 for the technology resource request without having the approval entity access the technology resource module 310. Further, the approval messages 342 are, according to some embodiments of the invention, configured to include an activatable link which allows the approval entity to send the requester a query 346 related to the technology resource request, which is captured and logged by the technology resource module 310, even though the approval entity does not access the technology resource module 310 in making the query 346.

Further, the technology resource module 310 includes logging engine 348 which is configured to log details of all events/actions 350 conducted within the technology resource module 310; including, but not limited to, actions/inputs made by the requester, as well as, actions taken by approval entities. Specifically, such logged details of events/actions 350 include inputs by the requester, including storage locations of any uploaded data files, approval entities, approval time (i.e., time between when approval message was sent and when the approval entity approved) and the like. The logged data not only provides for an audit trail but also provides the basis for analytical data and/or determination of relevant metrics related to the technology resource control process.

In additional embodiments of the invention, technology resource module 310 includes analytics engine 352 which is configured to provide analytics data 354. In specific embodiments of the invention analytics data 354 is presented via a analytics dashboard 356, in which, a user can select parameters and/or filters for presenting analytic data 354 or the analytic data can be presented in analytic reports which are generated dynamically on an on-demand basis and/or per a predetermined schedule and communicated to designated individuals/entities.

Figure 3:
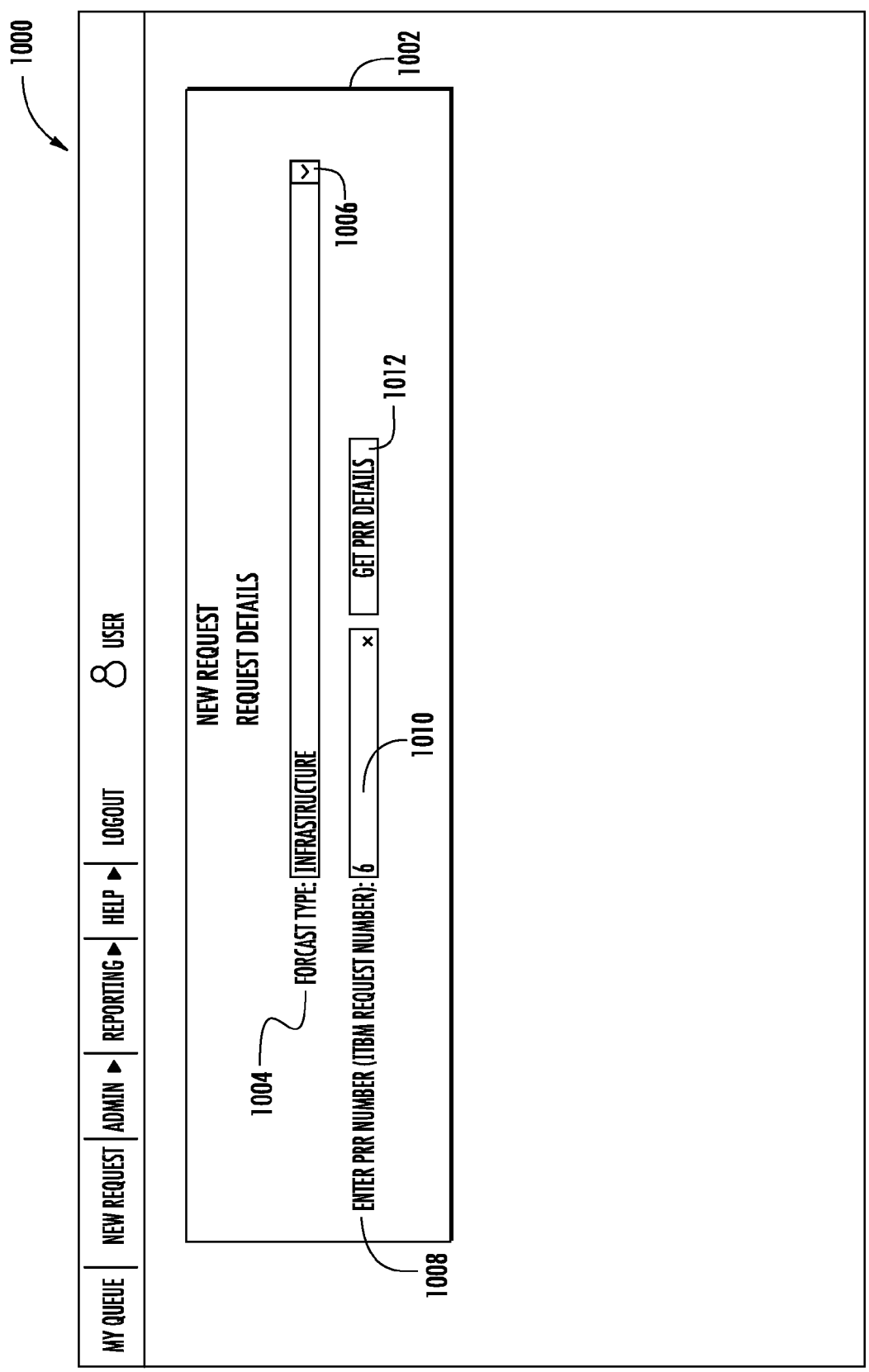

Referring to FIGS. 3-10, exemplary user interfaces 314 (as described in FIG. 2) presented by the technology resource module 310, in accordance with embodiments of the present invention. The user interfaces 314 shown in FIGS. 3-10 are by way of example only and should note be construed as limiting. In this regard, other user interfaces 314 are possible, which include the same information as depicted in FIGS. 3-10 or other information, and are within the confines of the inventive concepts herein disclosed. FIG. 3 depicts user interface 1000 which is configured to receive a new technology resource request, in accordance with an embodiment of the invention. User interface 1000 is presented to a user in response to the user logging-in (i.e., presented requisite user credentials) into the technology resource module/tool 310. The new request window 1002 is presented to the user upon the user selected the "new request" tab located at the top of the user interface 1002. The new request window 1002 includes a "forecast type" request detail 1004 and an associated drop-down menu 1006 for user selection of an appropriate forecast/technology resource type. In the illustrated embodiment shown in FIG. 3, the user has selected "infrastructure" as the forecast type. Additionally, new request window 1002 includes "request number" request detail 1008 for user input within data entry field 1010 of a request number/identifier, which is tied with a project/task tool or some other upstream tool associated with the technology resource. Once the user has entered the appropriate "request/project number/identifier" in data entry field 1010, the user activates key/button 1012, which serves to retrieve (via implementation of an Applications Programming Interface (API)) data from one or more ancillary applications, such as one or more upstream applications/tools tied to the request/project number/identifier.

Figure 4:
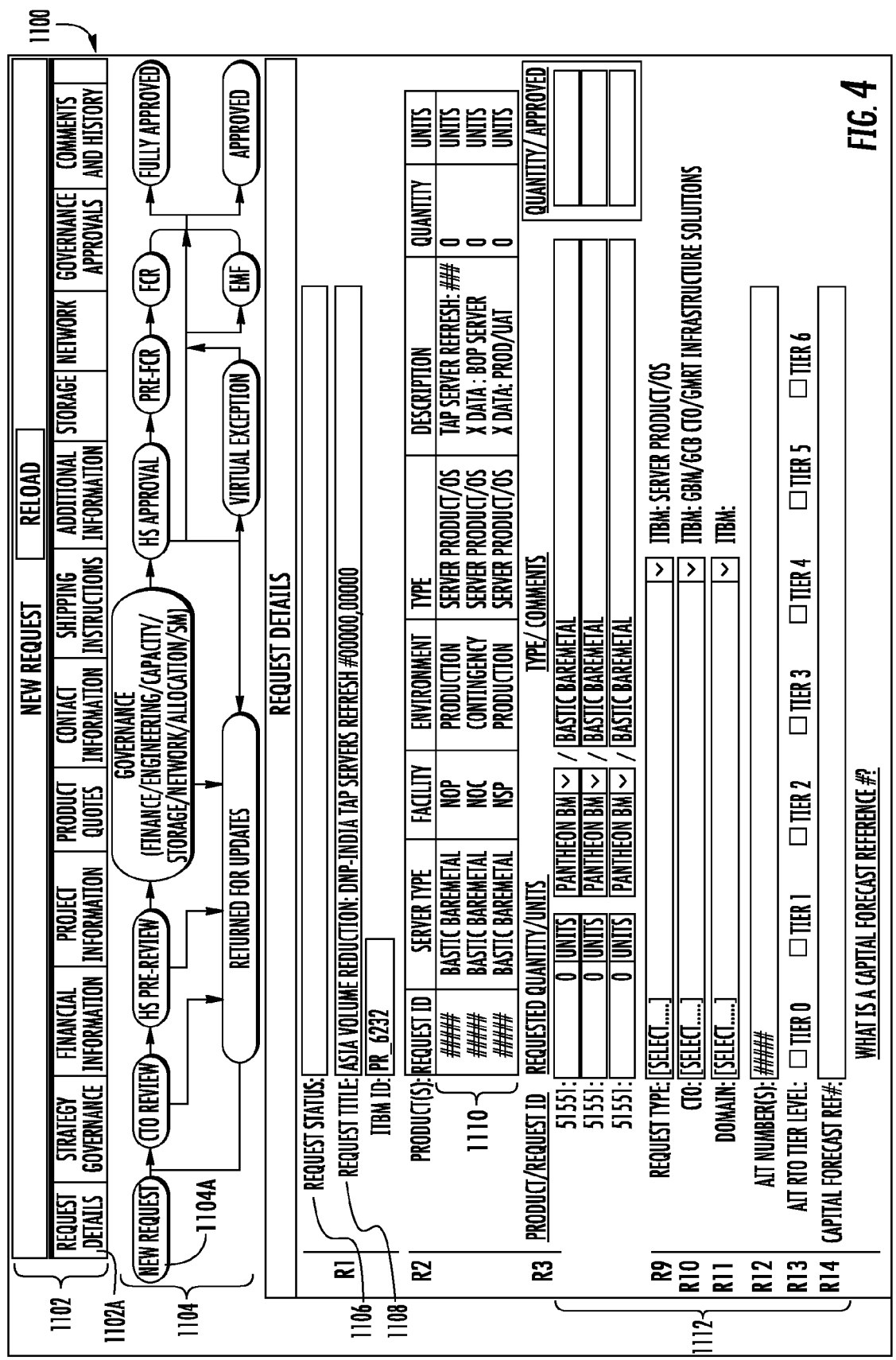

Referring to FIG. 4, depicted is user interface 1100 which is presented to a user in response to user activation of the key/button 1012 (shown in FIG. 3) (i.e., after the module has retrieved data from the one or more ancillary applications/tools and pre-populated the retrieved data in requisite data entry fields. User interface 1100 includes tabs 1102, each tab associated with a different data type required by the technology resource control/governance process. In the illustrated embodiment of FIG. 4, tab 1102A entitled "request details" is highlighted to indicate that user interface 1110 is associated with request details. Further, user interface 1100 includes a workflow diagram 1104, which depicts the technology resource process flow and highlights the current position within the workflow. In the illustrated embodiment of FIG. 4, workflow box 1104A, entitled "new request" is highlighted to indicate that the technology resource acquisition process currently is in the new request stage. As shown in the succeeding figures, according to specific embodiments of the invention, the workflow diagram 1104 is included within most user interfaces presented by the technology resource module 310. Further user interface 1100 includes various entry fields for request details, such as request status 1106, request title 1108, related products 1110 and various other request details 1112. It should be noted that data entries for the related products 1100 are retrieved data imported from the ancillary application(s)/tool(s). Any data fields which have not been pre-populated with retrieved data require user inputs.

Figure 5:
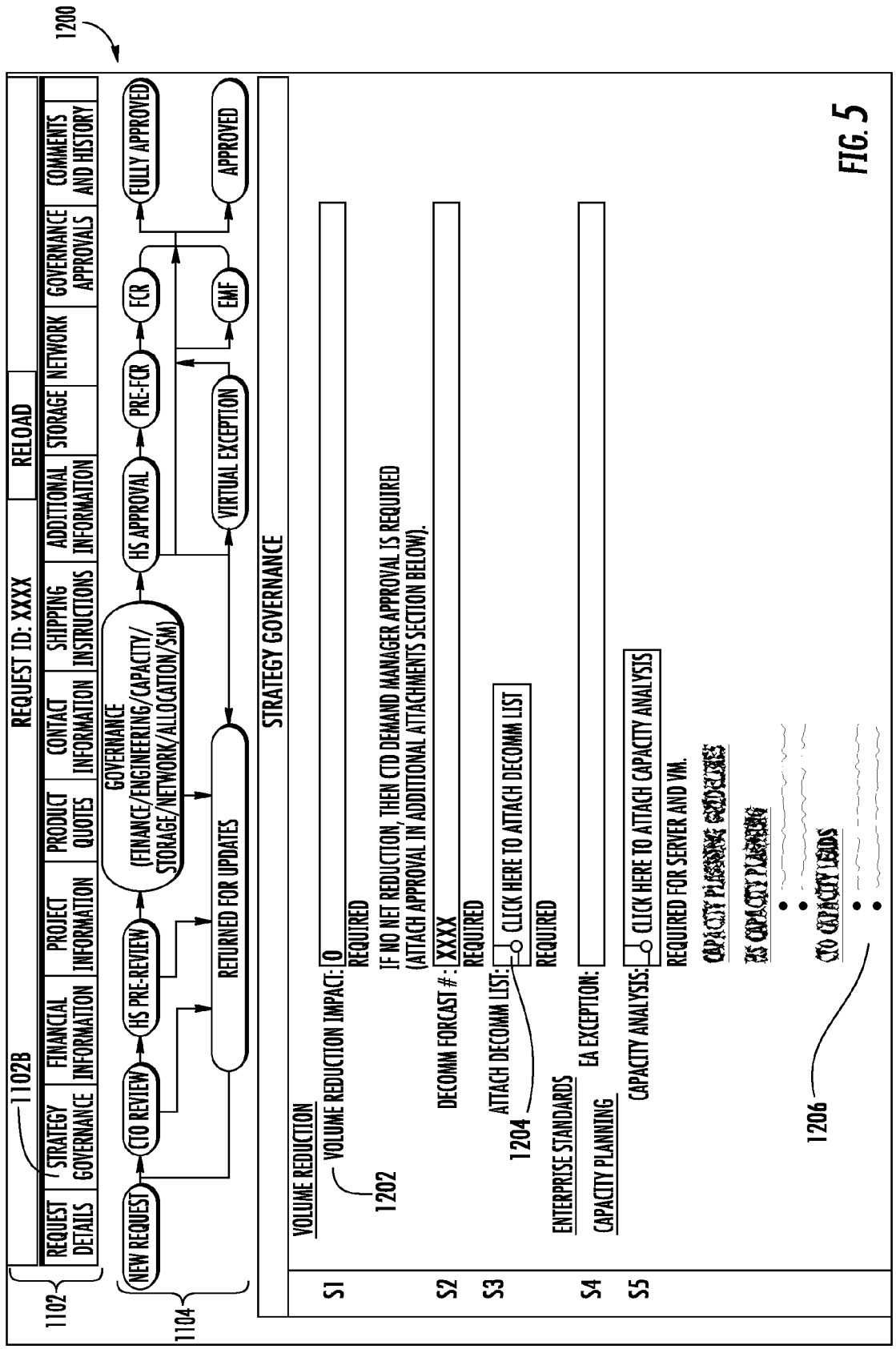

Referring to FIG. 5, depicted is user interface 1200, which is presented to the user in response to the user selecting tab 1102B, entitled "strategy governance". User interface 1200 depicts workflow diagram 1104 currently at the "governance" stage 1104E of the workflow. User interface 1200 includes various strategy governance data entry fields. For example, the strategy governance data entry fields include volume reduction impact 1202 and associated data entry field, which includes a "required" designator to indicate that the user/requester is required to provide an input in the volume reduction impact 1202 data entry field. In addition, the strategy governance data entry fields include key/button 1204 which, upon user activation, allows for the user to attach/upload a decomm list for devices that are forecasted to be decommissioned based on the technology resource request. As previously discussed in relation to volume reduction impact 1202, the key/button 1204 includes a "required" designator to indicate that the user/requester is required to attach a decomm list. User interface 1200 additionally includes strategy governance information and/or data entry fields 1206, which have been grayed-out or are otherwise blurred or indiscernible to highlight information or date entries that are not of concern to the type of technology resource associated with the request.

Figure 6:
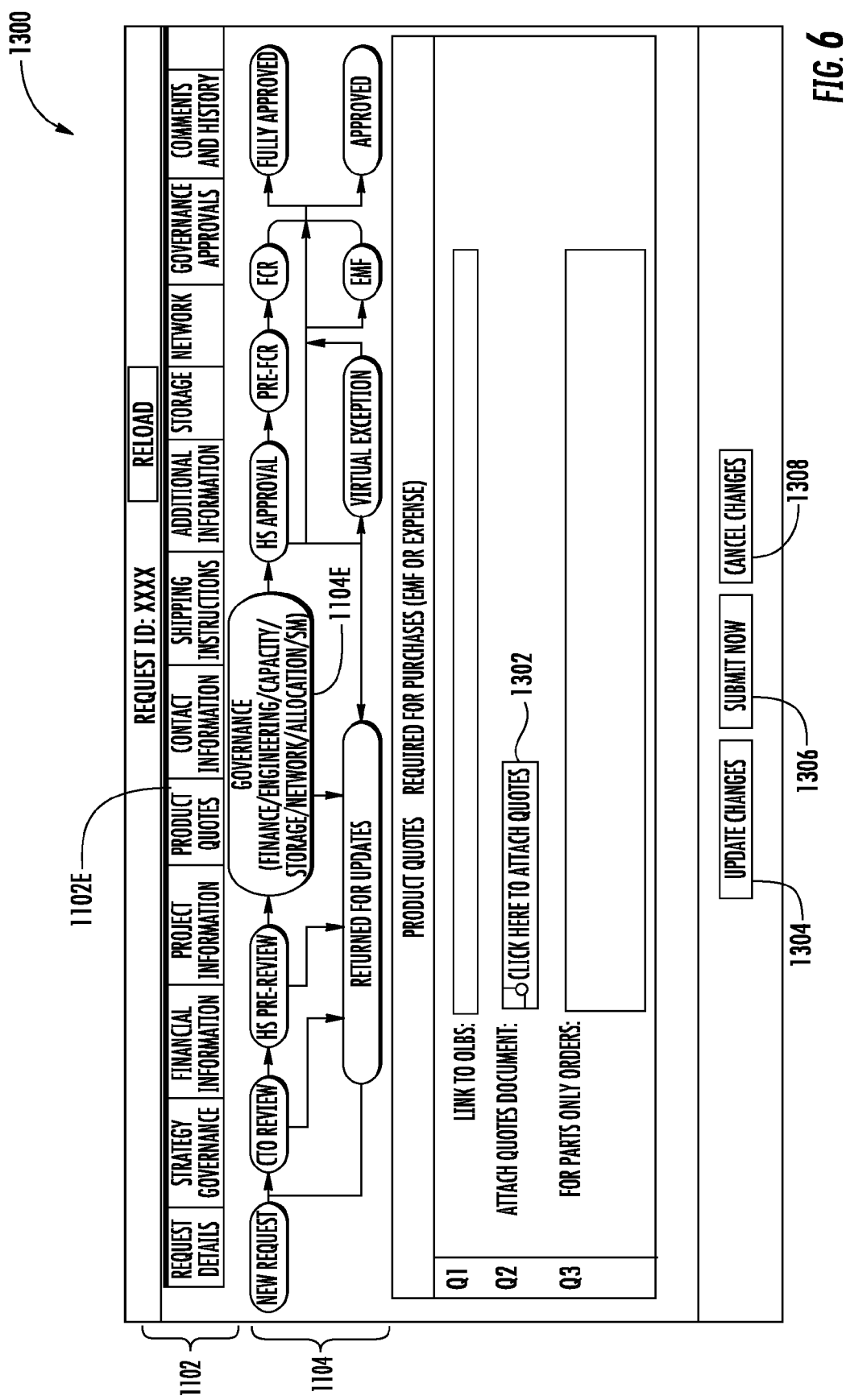

Referring to FIG. 6, depicted is a user interface 1300, which is presented to the user in response to the user selecting tab 1102E, entitled "Product Quotes". User interface 1300 depicts workflow diagram 1104 currently at the "governance" stage 1104E of the workflow. User interface 1300 includes various strategy governance data entry fields. For example, the strategy governance data entry fields include attach quotes document 1302, which, upon user activation, allows for the user to attach/upload a quote document associated with a quote for the device and/or software associated with the technology resource request. In addition, user interface 1300 includes update changes button/key 1304, which, upon user activation, saves the user inputs within the product quote portion; cancel changes button/key 1306, which, upon user activation, clears/cancels all of the unsaved user inputs from the product quote portion; and submit flow button/key 1306, which, upon user activation, finalizes the flow for submission to the validation process.

Figure 7:
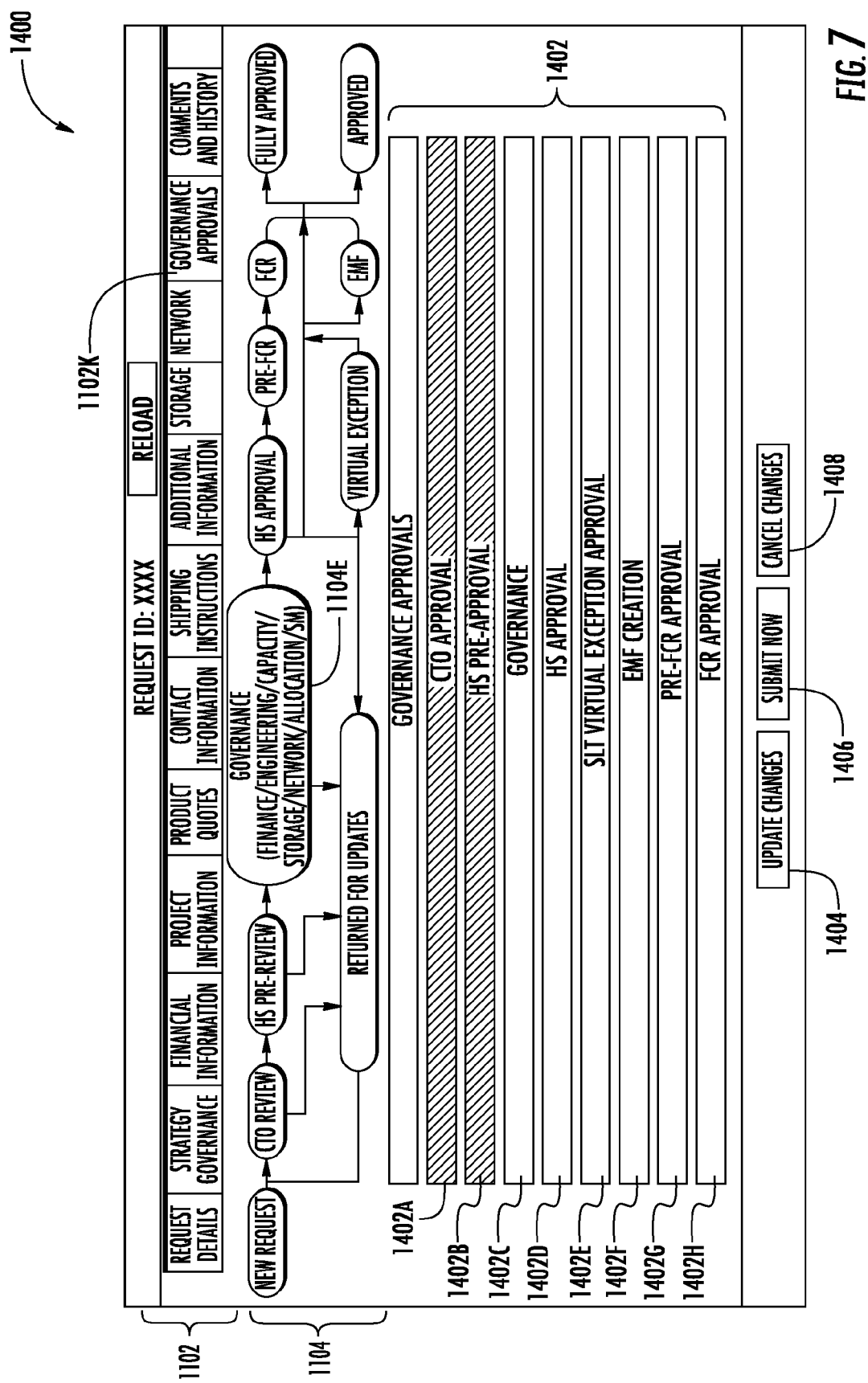

Referring to FIG. 7 depicted is a user interface 1400, which is presented to the user in response to the user selecting tab 1102K, entitled "Governance Approvals". It should be noted that tab 1002K is only shown to the user as being activatable once the approval stage has been initiated (i.e., once all the requisite data entries have been completed and data has been validated). User interface 1400 includes a status of governance approvals 1402 for the various approval entities. In the illustrated example of FIG. 7, user interface 1400 highlights approval entities "CTO Approval" 1402A and "HS Pre-Approval" 1402B, such highlighting (e.g., color-coding or the like) indicates that the technology resource request has been approved by these approval entities. The non-highlighted (e.g., color-coding or the like) approval entities 1402C-1402H indicate that these approval entities have yet to approve the technology resource request. Each approval entity 1402A-140H is configured as an activatable button/key, which, upon user activation, displays details about the approval (e.g., who approved, when approved, and comments and the like) or the outstanding approval request (e.g., when request was sent, who the request was sent to, any queries made by the requester and the like). In addition, user interface 1400 includes update changes button/key 1404, which, upon user activation, saves the user inputs within the governance approval portion; cancel changes button/key 1406, which, upon user activation, clears/cancels all of the unsaved user inputs from the governance approval portion; and submit flow button/key 1406, which, upon user activation, finalizes the flow for submission to the next stage of the technology resource acquisition process.

Figure 8:
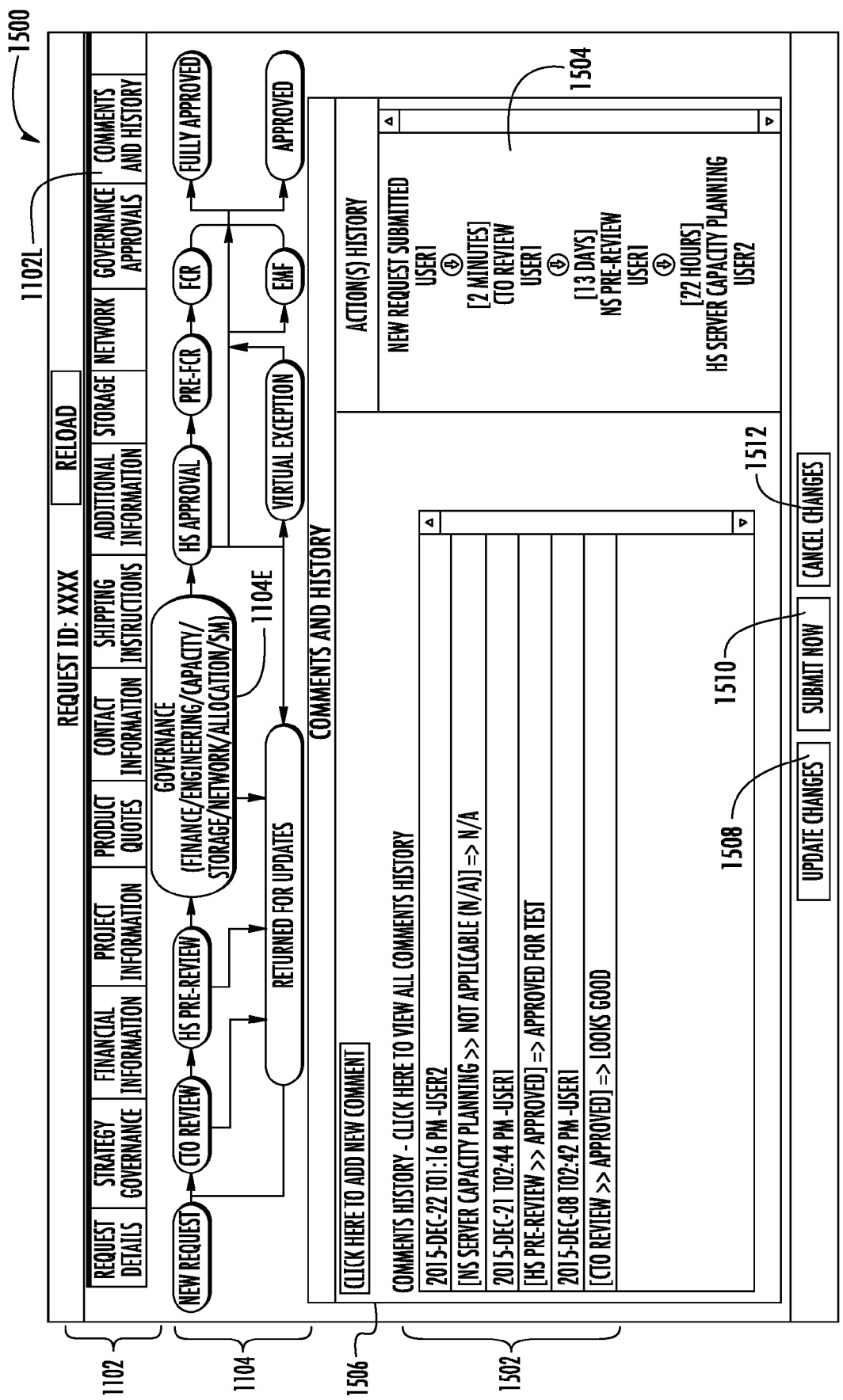

Referring to FIG. 8 depicted is a user interface 1500, which is presented to the user in response to the tab 1102L, entitled "Comments and History". It should be noted that tab 1002L is only shown to the user as being activatable once the approval stage has been initiated (i.e., once all the requisite data entries have been completed and data has been validated). User interface 1500 includes comment history 1502, which lists in chronological order the comments provided during the approval stage, including the date and time of the comment, who made the comment and the comment itself. Additionally, user interface 1500 includes button/key 1506, which, upon activation, by the user (who may be the requester and/or an approval entity), allows for the user to enter a comment. In addition, user interface 1500 includes action history, which includes a chronological listing of actions, including the name of the action, who conducted the action, the date/time of the action and the length in time from when the action was requested. In addition, user interface 1500 includes update changes button/key 1508, which, upon user activation, saves the user inputs within the comments and history portion; cancel changes button/key 1512, which, upon user activation, clears/cancels all of the unsaved user inputs from the comments and history portion; and submit flow button/key 1306, which, upon user activation, finalizes the flow for submission to the next stage of the technology resource process.

Referring to FIG. 8 depicted is a user interface 1500, which is presented to the user in response to the tab 1102L, entitled "Comments and History". It should be noted that tab 1002L is only shown to the user as being activatable once the approval stage has been initiated (i.e., once all the requisite data entries have been completed and data has been validated). User interface 1500 includes comment history 1502, which lists in chronological order the comments provided during the approval stage, including the date and time of the comment, who made the comment and the comment itself. Additionally, user interface 1500 includes button/key 1506, which, upon activation, by the user (who may be the requester and/or an approval entity), allows for the user to enter a comment. In addition, user interface 1500 includes action history, which includes a chronological listing of actions, including the name of the action, who conducted the action, the date/time of the action and the length in time from when the action was requested. In addition, user interface 1500 includes update changes button/key 1508, which, upon user activation, saves the user inputs within the comments and history portion; cancel changes button/key 1512, which, upon user activation, clears/cancels all of the unsaved user inputs from the comments and history portion; and submit flow button/key 1306, which, upon user activation, finalizes the flow for submission to the next stage of the technology resource process.

Figure 9:
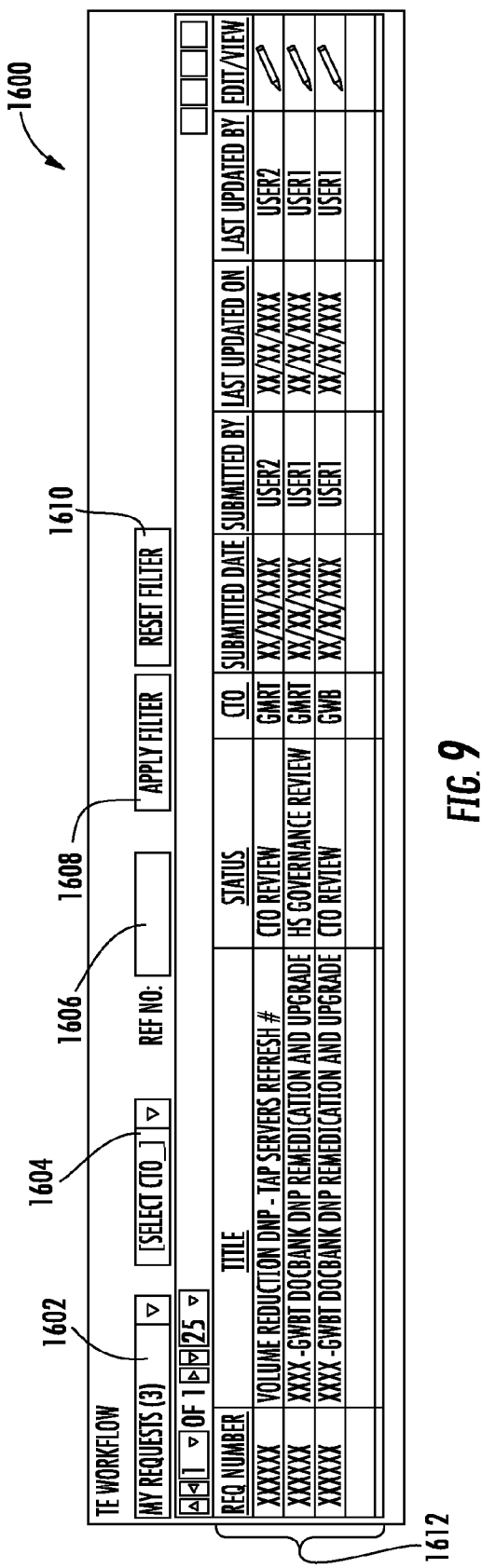

Referring to FIG. 9, shown is a user interface 1600 configured to display information surrounding technology resource requests, in accordance with embodiments of the present invention. Data entry field 1602 allows for a user to select, from a dropdown menu, which technology resource requests 1612 to display; for example the user's technology resource requests, all current outstanding technology resource requests or the like. Data entry field 1604 allows for the user to select filter criteria, from a dropdown menu, to pare down/filter the technology resource requests 1612 that are presented; for example, filter criteria may include line of business, requester or the like. Data entry field 1604 allows the user to enter a request number to provide for display of the single technology resource request associated with the request number. Apply filter button/key 1608 is activatable to apply the filter selected by the user in data entry field 1604 and reset filter button/key 1610 is activatable to cancel any previously applied filters. The listing of technology resource requests includes details associated with the technology resource request including request number, request title, status of request, line-of-business, request date, requester name, last update date, last update name and an option to edit/view details associated with the technology resource request. Each detail field is sortable, alphabetically or by date.

Figure 10:
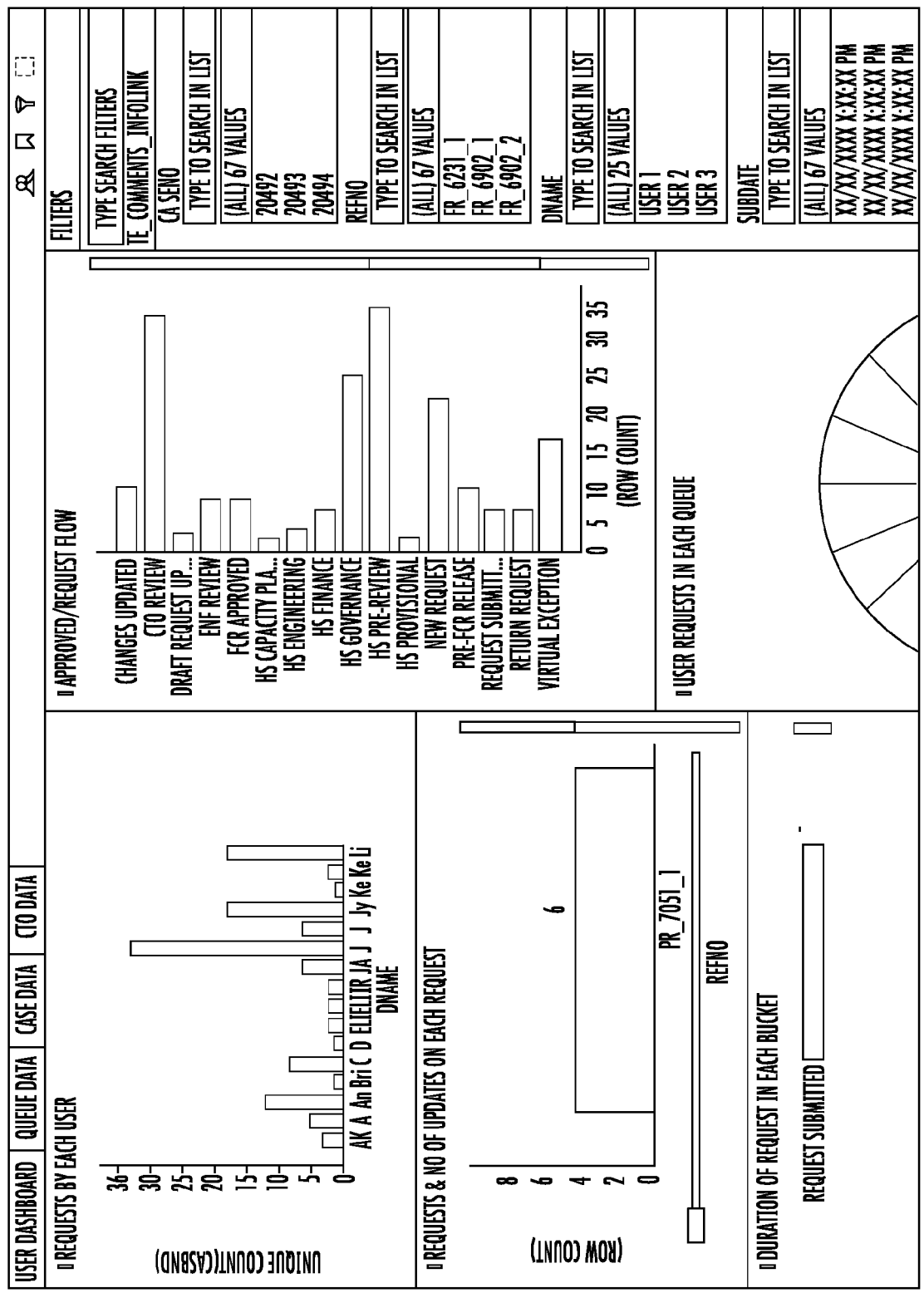

Referring to FIG. 10 a user interface 1700 is depicted, which provides for an analytics dashboard which shows various different graphs of information associated with technology resource requests; including requests by each user/requester, requests and number of updates on each request; duration of request in each bucket/phase; approved request flow; user requests in each queue and the like. The dashboard is also configured, on the right-hand side of the user interface 1700 to allow the user to apply filters, which reconfigure the graphs, such as user/requester filters; time filters and the like.

Thus, systems, apparatus, methods, and computer program products described above provide for provide for a fully automated process for control of technology resources. Specifically the present invention, streamlines the data entry process for initiating a requisite by employing an Application Programming Interface (API) to make calls to other applications/tools (e.g., project tools and the like) and automatically imports data from the other applications/tools to the technology resource module/tool. Moreover, the present invention provides for automated validation of data entries by employing the API to make calls to systems of record and the like to compare data entries to data in the systems of record. The invention is configured such that technology resource process will not proceed to the review/approval stage until successful validation of all requisite data entries has been completed.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus for automated control and governance of technology procurement, the apparatus:
    a computing platform having a memory and at least one processor in communication with the memory;
    an application programming interface stored in the memory and executable by the processor; and
    a technology resource module stored in the memory, executable by the processor and including:
        a user interface application configured to present, to a technology resource user, a plurality of user interfaces for managing a technology resource control process, wherein one or more of the user interfaces include a listing of technology resource request events associated, wherein the listing including event start times, length of time for an event, and user comments associated with an event,
        a technology resource request and data entry sub-module configured to (i) provide one or more of the user interfaces for initiating a technology resource request for procuring at least one of computing software or computing hardware, wherein the request includes user input of at least one project identifier associated with auxiliary applications, (ii) automatically, in response to initiating the technology resource request, implement the application programming interface to access, using the project identifiers, one or more of the auxiliary applications to retrieve data and provide entry of the retrieved data in requisite data entry fields, and (iii) receive user inputs to one or more of the requisite data entry fields,
        an integration and validation sub-module configured to automatically validate data entries provided in the requisite data fields, by implementing the application programming interface to access one or more systems of record and compare the data entries to data in the systems of record, wherein successful validation of data entries is required prior to proceeding to a successive stage of the technology resource control process, and
        a messaging sub-module configured to, in automatic response to validating data entries provided in the requisite data fields, generate a plurality of approval messages and initiate communication of the approval messages to predetermined technology resource approval entities, wherein the approval messages are configured to allow the entities to access a link that approves the technology resource control request absent the entities accessing the technology resource module.

2. The apparatus of claim 1, wherein the messaging engine sub-module is further configured to generate the plurality of approval messages, wherein the approval messages are configured to provide the technology resource approval entities an ability to communicate queries to an technology resource requestor, via the technology resource module, absent the entities accessing the technology resource module.

3. The apparatus of claim 1, wherein the technology resource module further comprises a logging sub-module configured to track, log and store details of each action taken by the technology resource module.

4. The apparatus of claim 1, wherein the technology resource module further comprises an analytics sub-module configured to determine analytical data associated the technology resource control processes.

5. The apparatus of claim 1, wherein the technology resource request and data entry sub-module is further configured to (iii) receive user inputs to the requisite data entry fields, wherein the user inputs include uploading one or more documents that fulfill a data request.

6. The apparatus of claim 1, wherein the user interface application is further configured to present the plurality of user interfaces for managing a technology resource control process, wherein the user interfaces include an analytics dashboard that presents a visual display of the analytical data.

7. The apparatus of claim 1, wherein the user interface application is further configured to present the plurality of user interfaces for managing a technology resource control process, wherein the user interfaces include a user queue that includes technology resource request initiated by the user and approval requests requiring approval by the user.

8. The apparatus of claim 1, wherein the user interface application is further configured to present the plurality of user interfaces for managing a technology resource control process, wherein one or more of the user interfaces include an overall technology procurement control process workflow that visually displays the current status of a current technology resource control process.

9. The apparatus of claim 1, wherein the user interface application is further configured to present the plurality of user interfaces for managing a technology resource control process, wherein one or more of the user interfaces include data tabs that indicate different data types, wherein user selection of a data tab provides display of one or more user interfaces that provide the requisite data entry fields for a data type associated with the selected data tab.

10. The apparatus of claim 1, wherein the user interface application is further configured to present the plurality of user interfaces for managing a technology resource control process, wherein one or more of the user interfaces include current technology resource request approval status, for each of the technology resource approval entities, for a technology resource request, wherein the current approval status provides access to details related an approval, a non-approval or a pending approval request.

11. The apparatus of claim 1, wherein the user interface application is further configured to present the plurality of user interfaces for managing a technology resource control process, wherein one or more of the user interfaces provide a searchable listing of current in-progress technology resource control processes.

12. The apparatus of claim 1, wherein the technology resource module is further configured to provide data resulting from a completed resource control processes to a provisioning module.

13. A system for automated control of technology resources, the system comprising:

one or more auxiliary applications which are configured to receive and store, in a first memory, first data associated with technology projects;

one or more systems of records stored in a second memory and configured to store second data used to validate data entries in a technology resource module;

a computing platform having a third memory and at least one processor in communication with the third memory;

an application programming interface stored in the third memory and executable by a computing processor; and a technology resource module stored in the third memory, executable by the processor and including:

a user interface application configured to present, to a technology resource user, a plurality of user interfaces for managing a technology resource control process, wherein one or more of the user interfaces include a listing of technology resource request events associated, wherein the listing including event start times, length of time for an event, and user comments associated with an event, a technology resource request and data entry sub-module configured to (i) provide one or more of the user interfaces for initiating a technology resource request for procuring at least one of computing software or computing hardware, wherein the request includes user input of at least one project identifier associated with one or more of the auxiliary applications, (ii) automatically, in response to initiating the technology resource request, implement the application programming interface to access, using the project identifiers, one or more of the auxiliary applications to retrieve data and provide entry of the retrieved data in requisite data entry fields, and (iii) receive user inputs to one or more of the requisite data entry fields, an integration and validation sub-module configured to automatically validate data entries provided in the requisite data fields, by implementing the application programming interface to access one or more systems of record and compare the data entries to data in the systems of record, wherein successful validation of data entries is required prior to proceeding to a successive stage of the technology resource control process, and a messaging sub-module configured to, in automatic response to validating data entries provided in the requisite data fields, generate a plurality of approval messages and initiate communication of the approval messages to predetermined technology resource approval entities, wherein the approval messages are configured to allow the entities to access a link that approves the technology resource control request absent the entities accessing the technology resource module.

14. The system of claim 13, wherein the messaging sub-module is further configured to generate the plurality of approval messages, wherein the approval messages are configured to provide for the technology resource approval entities an ability to communicate queries to an technology resource requestor, via the technology resource module, absent the entities accessing the technology resource module.

15. The system of claim 13, wherein the technology resource module further comprises a logging sub-module configured to track, log and store details of each action taken by the technology resource module.

16. The apparatus of claim 13, wherein the technology resource module further comprises an analytics sub-module configured to determine analytical data associated the technology resource control processes.

17. A computer program product including a non-transitory computer-readable medium, the computer-readable medium comprising:
- a first set of codes for causing a computer to present display of a plurality of user interfaces for managing a technology resource control process, wherein one or more of the user interfaces provide for initiating a technology resource request for procuring at least one of computing software or computing hardware, and wherein one or more of the user interfaces include a listing of technology resource request events associated, wherein the listing including event start times, length of time for an event, and user comments associated with an event;
- a second set of codes for causing a computer to (i) receive a user input that initiates the technology resource request, wherein the input includes at least one project identifier associated with auxiliary applications, (ii) automatically, in response to initiating the technology resource request, implement an application programming interface to access, using the project identifiers, one or more of the auxiliary applications to retrieve data and provide entry of the retrieved data in requisite data entry fields, and (iii) receive user inputs to the requisite data entry fields;
- a third set of codes for causing a computer to automatically validate data entries provided in the requisite data fields, by implementing the application programming interface to access one or more systems of record and compare the data entries to data in one or more systems of record, wherein successful validation of data entries is required prior to proceeding to a successive stage of the technology resource control process; and
- a fourth set of codes for causing a computer to, in automatic response to validating data entries provided in the requisite data fields, generate a plurality of approval messages and initiate communication of the approval messages to predetermined technology resource approval entities, wherein the approval messages are configured to allow the entities to access a link that approves the technology resource control request absent the entities accessing the technology resource module.

* * * * *